Figure 6:
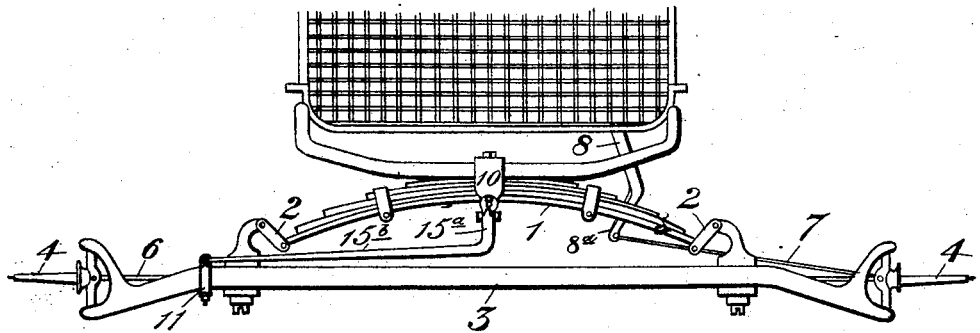

May 4, 1926.
J. F. WAGNER
STEERING ATTACHMENT
Filed April 3, 1923 2 Sheets-Sheet 1
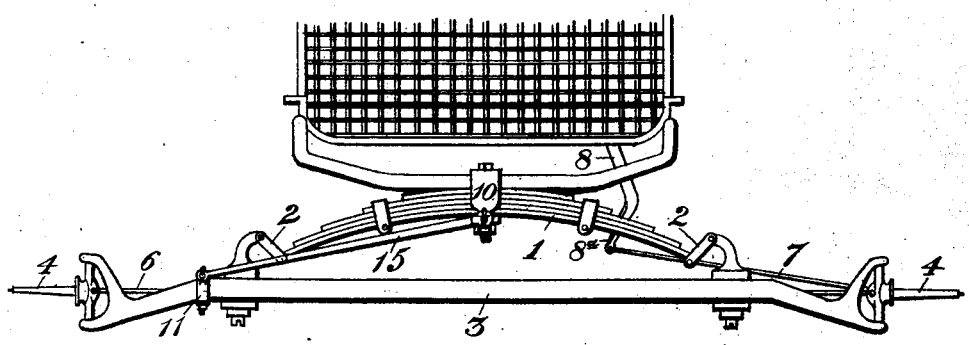
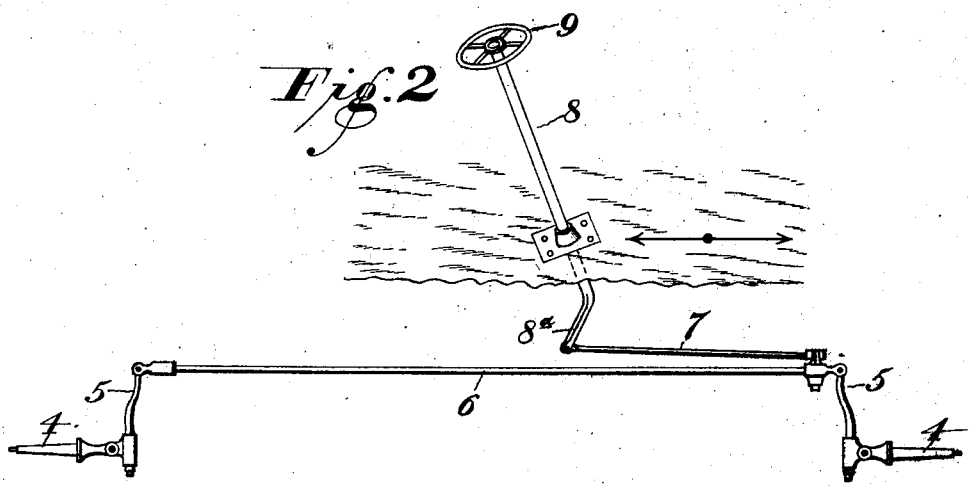
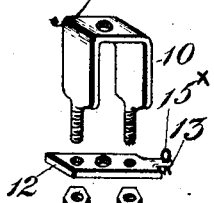
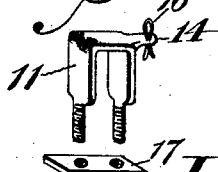
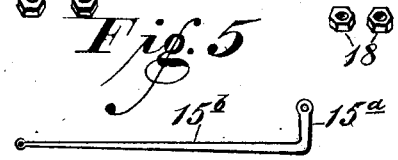
Inventor
John F. Wagner
By E. E. Overholt
Attorney.

May 4, 1926.

J. F. WAGNER 1,583,629

STEERING ATTACHMENT

Filed April 3, 1923

2 Sheets-Sheet 2

Inventor,

John F. Wagner,

By E.E. Overholt

Attorney.

Patented May 4, 1926.

1,583,629

UNITED STATES PATENT OFFICE.

JOHN F. WAGNER, OF ORISKA, NORTH DAKOTA.

STEERING ATTACHMENT.

Application filed April 3, 1923. Serial No. 629,664.

*To all whom it may concern:*

Be it known that I, JOHN F. WAGNER, a citizen of the United States, residing at Oriska, in the county of Barnes and State of North Dakota, have invented certain new and useful Improvements in Steering Attachments, of which the following is a specification.

My invention relates to means for holding the steering bar support of a Ford car from playing laterally to the right and left relatively to the part of the steering mechanism which connects the front axles.

In Ford cars, the springs which support the body of the car are connected to the frame by shackles which permit the body to rock or swing to one side or the other. The steering wheel and the bar which connects it with the other steering mechanism is mounted in the body of the machine, and the parts are so arranged relatively to each other that the steering wheel is in its normal position when the car is standing on a level road with the body supported midway of the frame. But it is very common to have roads rounded up in the middle to make them shed off water into the gutters at either side; and in driving a Ford car over this sort of a road, under circumstances where you have to keep to one side or the other of the centre of the road, the inclination of the car will impart to the body a tendency to swing toward the lower side, which tendency the driver must prevent by holding the car body centrally of the frame, by means of the steering wheel. If he fails to do this, the lateral movement of the body of the car relative to the frame will operate the steering mechanism and steer the car wrong. Hence when traveling on a laterally inclined road bed with a Ford car, the driver has to resist, (with the steering wheel,) this continuous tendency of the body to swing to one side. This makes steering a Ford car, under such circumstances, hard work, and the object of the present invention is to provide simple, durable, and inexpensive means for holding the steering wheel upport against appreciable lateral movement relatively to the frame of the machine, so that a Ford car may be steered as easily on an inclined road bed as on a level road.

The invention consists in the novel construction and arrangement of parts, as will be hereinafter described and claimed, reference being had to the accompanying drawings, in which:—

Fig. 1 is a front view of a portion of a Ford car showing my improvement attached thereto. Fig. 2 is a top plan view showing the steering wheel and other steering mechanism connected therewith. Figs. 3 and 4 are forms of clips which may be used with my device; Fig. 5 is a side elevation of one form of stay rod which I employ; and, Fig. 6 is a view similar to Fig. 1, but with the form of stay rod illustrated in Fig. 5.

Referring further to the drawings, the numeral 1 indicates the front spring of a Ford car, pivotally engaged at its ends by the shackles 2, which are in turn suitably supported on the front end bar 3 of the car frame, which bar carries the axles 4 of the front wheels at its ends. These axles in turn are controlled by the steering levers 5, which are pivotally connected together by the lever rod 6, to cause them to operate in unison when said rod is moved longitudinally to the right or to the left. This rod 6 is connected, by means of the pitman 7, with the crank 8$^a$ at the lower end of the steering bar 8, which bar is suitably supported in the body if the car and rotated by the steering wheel 9 at its upper end; all in accordance with the usual well known construction employed in Ford cars.

As thus far described, it will be seen from Fig. 1, that when one side of the car is lower than the other, the body of the car will have a tendency to swing over a little on the shackles toward that side. And this movement causes the steering bar which is mounted in the body of the machine to move laterally relatively to the rest of the steering mechanism, with the result that the lower end of the crank 8$^a$ will be rotated inwardly or outwardly according to the direction in which the body swings; or else the steering mechanism will be operated to run the car to one side of the road. The result of all this is that the driver, (through the steering wheel,) must hold the body of the car against appreciable lateral movement relatively to the frame, and this becomes burdensome in driving on a road that is inclined toward one side or the other.

My invention effectually overcomes all this difficulty by providing means for holding the steering bar at an approximately constant distance from the pivot points of the axles of the front wheels of the vehicle, irrespective of whether the road is level or inclined toward one side or the other.

In carrying this out I provide the body of the car with a clip 10, and the axle with a clip 11. I have shown the clip 10 attached to the front spring of the car, and the clip 11 to the front axle, but these clips may be attached to other parts of the body supporting mechanism if desired, the essential feature being that one must be attached to the body support and the other to the body of the car or whatever part carries the steering bar.

This clip 10 is in fact the usual clip that comes on a Ford car, but I provide for it an underplate 12 to replace the underplate that comes with the clip, the only difference being that my underplate has a projection 13 at its outer end for pivotally engaging the bore at the inner end of the brace bar 15; and the clip 11 has at its upper end an outwardly extending projection 14.

The clips 10 and 11 are connected together by the brace rod 15, which is provided with a hole at each end for snugly receiving said clip projections 13 and 14 which are provided at their outer ends with small bores for the reception of cotter pins 15× and 16 respectively, to hold the bar 15 in position thereon. From this arrangement it will be seen that the spring 1 and the car body supported thereon cannot swing laterally on the shackles 2. This relieves the steering mechanism from the strain imposed upon it by the tendency of the car body to swing to one side or the other as indicated above, so that with this arrangement a Ford car may be steered as easily as any other make of car.

The clip 10 extends downwardly sufficiently to cause the bar 15 to approximate the horizontal when the springs are pressed down by the weight of the load on the car. In this way, the arc of the circle formed by the inner end of the brace rod 15, as it moves up and down, will vary so slightly from the vertical that the variation will not be appreciable from a practical standpoint.

In the form of bar illustrated in Fig. 5, I have shown the inner end provided with an upward extension 15ª, so that the main body 15ᵇ of the bar is normally disposed horizontally. By this arrangement, the bar is rendered slightly yielding to sudden or excessive lateral strain either to one side or the other, since in case of compression the main section of the bar will tend to bow downwardly, and in case of tension to bow upwardly. The bar is made smaller at its outer end, being tapered, to render it slightly yielding for the purpose just indicated.

It will be noticed that the brace rod 15 is at the opposite side of the automobile from the pitman rod 7 so that lateral movement of the body of the vehicle toward the pitman will be resisted by tensional strain or longitudinal pulling strain on the brace rod. If however in an unguarded moment, the driver should not be holding the steering wheel, and the body at that moment should lurch sidewise towards the brace bar leaving the same to sustain the entire force of the shock, the taper in said brace would permit it to buckle slightly and thereby yield sufficiently to relieve the sudden strain.

As pointed out above, the form of brace shown in Fig. 5, if left to sustain the entire shock in either direction, will slightly yield to absorb the force of the shock. It should be observed, however, that it is more important that provision be made for absorbing lateral shock when the movement is toward the brace rod 15 than when it is toward the pitman 7, for the following reason,—suppose the wheel adjacent the outer end of the brace rod 15 drops into a deep rut, thereby swinging the body of the device to that side and simultaneously therewith greatly compressing the spring 1, so that the brace rod 15 (as its inner end moves downwardly with the spring) will act as a powerful toggle to force the body in the opposite direction from that in which it is now moving, (that is inwardly toward the pitman 7). Hence in this case, the outward lateral movement and the downward movement of the body both combine to impose longitudinal compression on the brace rod 15, which would cause shock but for the buckling of said rod which absorbs the shock. Hence the great importance of having this rod made tapering as shown. But when the movement of the body is in the opposite direction from that described (i. e., when it is toward the pitman 7) the inner end of the brace rod as it moves downwardly with the spring will describe the segment of a circle convex toward the pitman, and thus in cooperation with the spring will slightly yield to said movement and initially absorb the shock, doing in a measure what the buckling of the rod does when the body is moved in the other direction. When the spring returns to its normal position, the slight movement referred to is taken up again, just as the movement permitted in the opposite direction by the buckling of the brace rod is taken up when the brace rod straightens. So that by the arrangement shown in Fig. 1, the buckling of the brace rod absorbs lateral shock in one direction, and the vehicle spring cooperating with said rod absorbs it in the opposite direction.

I have shown the clip 11 provided with an under plate 17, and securing nuts 18, but it will be understood that these clips only furnish means for pivotally engaging the two ends of the brace rod; and any other suitable means may be substituted in their stead without in the least departing from the spirit of the invention. The same would be true if the clips were respectively connected to other parts of the body and its support the only essential being that they should be so arranged as to hold said parts from moving laterally relatively to each other.

Having now described my invention, what I claim as new and desire to protect by Letters Patent is:—

1. In a device of the character described, the combination with a chassis having a spring mounted thereon, and a body supported on the spring at a material distance above the chassis to permit the body to yieldingly move up and down relatively to the chassis, said body being also adapted to move laterally on the chassis; a brace rod with its upper end pivotally connected to said body at approximately the centre thereof and extending diagonally downward and outward with its lower end pivotally connected to the chassis at one side thereof; steering mechanism for the chassis; an operating crank bar for said steering mechanism, said bar being carried by said laterally movable body and consequently movable therewith; and a pitman for connecting said crank bar with the steering mechanism, said brace rod being adapted to yield under compression and being on the opposite side of the chassis from the pitman whereby the yielding of the brace rod under compression permits the body to move laterally toward one side of the car, and the downward movement of the supporting spring permits it to move toward the other side of the chassis; and also whereby said brace rod and spring arrest the lateral movement of the body in both directions and yieldingly restore it to its normal position on the car, and thus relieve the pitman of appreciable strain in either direction.

2. In a device of the character described, the combination with a chassis having steering mechanism, and having a body mounted on the chassis to move laterally toward either side thereof, of a brace rod with its inner end connected to the body at approximately the centre thereof, and its outer end connected to the chassis at the side thereof; an operating crank bar carried by said body and movable therewith; and a pitman connecting said bar with the steering mechanism, said brace rod being formed with a shorter section at one end bent at an angle to the rest of the bar, whereby compression on said bar will cause its longer end to bow in one direction and tension on it will cause it to bow in the other direction, to adapt said rod to yieldingly resist lateral movement of the body in either direction and thereby relieve the pitman of appreciable lateral strain.

3. In a device of the character described, the combination with a chassis having steering mechanism, and having a body mounted on the chassis to move laterally toward either side thereof, of a brace rod with its inner end connected to the body at approximately the centre thereof, and its outer end connected to the chassis at the side thereof; an operating crank bar carried by said body and movable therewith; and a pitman connecting said bar with the steering mechanism, said brace rod being tapered, to render it more yielding.

In testimony whereof I affix my signature.

JOHN F. WAGNER.